F. P. ROESCH.
GEAR CHANGING AND LOCKING DEVICE.
APPLICATION FILED AUG. 17, 1915.
1,171,252.
Patented Feb. 8, 1916.
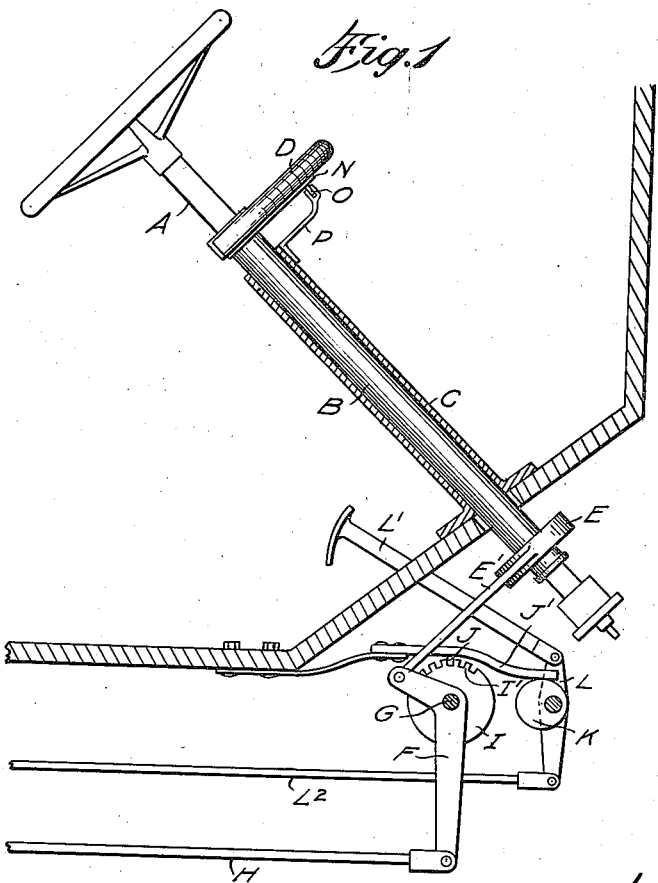
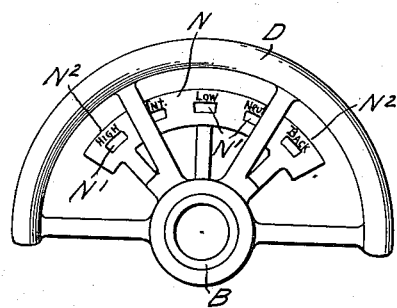
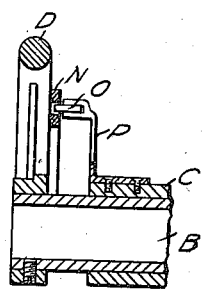
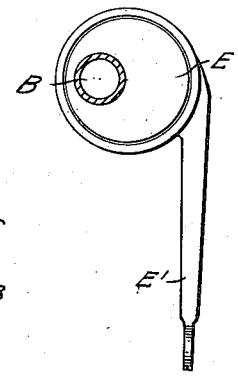
WITNESSES
F. D. Sweet
Geo. G. Hoskins
INVENTOR
Frank P. Roesch
BY
Munn & Co
ATTORNEYS

UNITED STATES PATENT OFFICE.

FRANK PIERRIE ROESCH, OF DOUGLAS, ARIZONA.

GEAR CHANGING AND LOCKING DEVICE.

1,171,252.  Specification of Letters Patent.  Patent

Application filed August 17, 1915. Serial No. 45,886.

*To all whom it may concern:*

Be it known that I, FRANK P. ROESCH, a citizen of the United States, and a resident of Douglas, in the county of Cochise and State of Arizona, have invented a new and Improved Gear Changing and Locking Device, of which the following is a full, clear, and exact description.

The object of the invention is to provide a new and improved gear changing and locking device, more especially designed for use on automobiles and other power vehicles, and arranged to permit the driver to change the speed gear and to securely lock the same in adjusted position by means located at the steering post, thus enabling the driver to pay attention to the roadway ahead without detraction when manipulating the changing and locking device.

In order to accomplish the desired result, use is made of a hollow shaft mounted to turn on the steering post of the vehicle, a controlling wheel on the said shaft and under the control of the operator, gear shifting means connected with and controlled from said hollow shaft, and a locking mechanism controlled by the clutch control of the vehicle and normally locking the said gear shifting means in inactive position. Use is also made of an indicator fixed on the controlling wheel and having indicating marks indicating the various positions of the gearing and a fixed pointer indicating on the said marks.

A practical embodiment of the invention is represented in the accompanying drawings forming a part of this specification, in which similar characters of reference indicate corresponding parts in all the views.

Figure 1 is a side elevation of the gear changing and locking device as applied, parts being shown in section; Fig. 2 is an enlarged plan view of the controlling wheel; Fig. 3 is a cross section of the same; and Fig. 4 is an enlarged face view of the eccentric on the hollow shaft, the latter being shown in section.

On the steering post A of an automobile or other power vehicle is mounted to turn a hollow shaft B extending through the usual steering post supporting sleeve C fixed on the vehicle body. On the upper end of the hollow shaft B is secured a segmental controlling wheel D under the control of the operator, and on the lower end of the hollow shaft B is arranged an eccentric E having its eccentric rod E' conr crank lever F mounted t G held on the vehicle bod lever F is connected by means with the gear shift usual construction. On tl F is attached a wheel I one of which is engaged a J held on a spring arm vehicle body. The free arm J' rests on the periph K attached to the clutch at one end with a foot nected at its other end by usual clutch of the gearin On the under side of the D is a fixed segment N number of spaced openi indicating marks $N^2$ arra said openings N' and ind ent positions of the gear, understood by reference t roller O is mounted on a to the sleeve C and the gages the under side of t is adapted to pass into an ings N' on turning the D, it being understood serves as a pointer relati $N^2$ to indicate the positi the time.

The operation is as follc tooth J of the arm J' e and consequently the bel held against swinging. to shift the gearing then first release the clutch, a so the operator presses tl part a swinging motion L for releasing the clutc movement given to the l cam K to swing the lever a tooth J is moved out o the notch I' and hence tl bell crank lever F are unl tor now turns the contr the right or to the left, a until the roller O registe N' having the mark of t gearing desired at the ti stood that when the cont turned and a swinging the bell crank lever F t correspondingly to the d indicated by the roller O ing mark $N^2$. When the reached, the operator releases the pedal L' so that the lever L returns to normal position and with it the cam K whereby the tooth J engages the corresponding notch I' to again lock the wheel I and the bell crank lever F in position.

The gear changing and locking device shown and described is very simple and durable in construction and can be readily applied to the various makes of automobiles as now generally constructed. By arranging the controlling wheel D at the steering post A the operator can readily manipulate this controlling wheel D without the slightest detraction, so that the operator can pay attention to the roadway and the traffic thereon.

Having thus described my invention, I claim as new and desire to secure by Letters Patent:

1. In a gear changing mechanism for power vehicles, a hollow shaft mounted to turn on the steering post of the vehicle, a controlling wheel on the said shaft and under the control of the operator, an eccentric on the said hollow shaft and having an eccentric rod, a lever connected with the said eccentric rod, gear shifting means connected with the said lever, and a locking mechanism controlled by the clutch control of the vehicle and normally locking the lever to hold said gear shifting means in inactive position.

2. In a gear changing mechanism for power vehicles, a hollow shaft mounted to turn on the steering post of the vehicle, a controlling wheel on the said shaft and under the control of the operator, an eccentric on the lower end of said hollow shaft, a bell-crank lever connected with the said eccentric, gear shifting means connected with the said lever, a locking mechanism controlled by the clutch control of the vehicle and normally locking the bell crank lever to hold said gear shifting means in inactive position, an indicator on the said controlling wheel and provided with spaced marks indicating the various positions of the gear, and a fixed pointer adapted on the said marks to indicate the position of the gear at the time.

3. In a gear-changing mechanism for power vehicles, a hollow shaft mounted to turn on the steering post of the vehicle, a controlling wheel on the said shaft and under the control of the operator, an eccentric on the said hollow shaft, a bell crank lever connected with the said eccentric and connected with the gear shifting means, a notched wheel on the said bell crank lever, a spring arm having a tooth engaging one of the notches of the said notched wheel, and a cam engaging the said spring arm and controlled by the clutch mechanism of the vehicle.

4. In a gear changing mechanism for power vehicles, a hollow shaft mounted to turn on the steering post of the vehicle, a controlling wheel on the said shaft and under the control of the operator, gear shifting means connected with and controlled from the said hollow shaft, and including a notched wheel, a spring arm having a tooth for engaging one of the notches of the wheel to normally lock the said gear shifting means in inactive position, a cam engaging the said spring arm and controlled by the clutch control of the vehicle, and an indicator on the said controlling wheel.

5. In a gear changing mechanism for power vehicles, a hollow shaft mounted to turn, a controlling wheel on the said shaft and under the control of the operator, a bell-crank lever connected with the gear shifting means to shift the gears, means connected with the hollow shaft for controlling said lever, and a locking mechanism for locking the said lever and controlled by the clutch control of the vehicle.

6. In a gear changing mechanism for power vehicles, a hollow shaft mounted to turn, a controlling wheel on the said shaft, and under the control of the operator, mechanism connected with the gear shifting means and controlled from the said hollow shaft, a spring locking arm engaging said mechanism to lock the same, a foot pedal, a clutch lever connected with the foot pedal and with the clutch of the gearing, and a cam attached to the clutch lever and controlling the said spring locking arm.

In testimony whereof I have signed my name to this specification in the presence of two subscribing witnesses.

FRANK PIERRIE ROESCH.

Witnesses:
LEWIS EGNELL,
JOHN F. MILLER.